United States Patent
Agrawal et al.

(10) Patent No.: US 8,121,749 B1
(45) Date of Patent: Feb. 21, 2012

(54) SYSTEM FOR INTEGRATING DYNAMICALLY OBSERVED AND STATIC INFORMATION FOR ROUTE PLANNING IN A GRAPH BASED PLANNER

(75) Inventors: Mukul Agrawal, Plymouth, MN (US); Daniel Chester Churchill, St Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 791 days.

(21) Appl. No.: 12/238,304

(22) Filed: Sep. 25, 2008

(51) Int. Cl.
*G01C 22/00* (2006.01)

(52) U.S. Cl. .......................................... 701/23; 701/25

(58) Field of Classification Search ................. 701/23, 701/25
See application file for complete search history.

(56) References Cited

U.S. PATENT DOCUMENTS

| | | |
|---|---|---|
| 4,862,373 A | 8/1989 | Meng |
| 4,905,151 A | 2/1990 | Weiman et al. |
| 4,982,329 A | 1/1991 | Tabata et al. |
| 5,083,256 A | 1/1992 | Trovato et al. |
| 5,111,401 A | 5/1992 | Everett, Jr. et al. |
| 5,321,614 A | 6/1994 | Ashworth |
| 5,379,223 A | 1/1995 | Asplund |
| 5,646,855 A | 7/1997 | Jones et al. |
| 5,758,298 A | 5/1998 | Guldner |
| 5,793,934 A | 8/1998 | Bauer |
| 5,870,303 A | 2/1999 | Trovato et al. |
| 5,878,368 A | 3/1999 | DeGraaf |
| 5,904,730 A | 5/1999 | Yamazaki et al. |
| 6,038,502 A | 3/2000 | Sudo |
| 6,084,989 A | 7/2000 | Eppler |
| 6,141,293 A | 10/2000 | Amorai-Moriya et al. |
| 6,249,738 B1 | 6/2001 | Higashimata et al. |
| 6,377,875 B1 | 4/2002 | Schwaerzler |
| 6,567,749 B2 | 5/2003 | Matsuura |
| 6,577,269 B2 | 6/2003 | Woodington et al. |
| 6,597,981 B2 | 7/2003 | Nishira et al. |
| 6,785,610 B2 * | 8/2004 | Baker et al. .................. 701/301 |
| 6,834,380 B2 | 12/2004 | Khazei |
| 6,907,336 B2 | 6/2005 | Gray et al. |
| 6,926,233 B1 | 8/2005 | Corcoran, III |
| 6,984,952 B2 * | 1/2006 | Peless et al. .................. 318/580 |
| 7,093,211 B1 | 8/2006 | Downey et al. |

(Continued)

FOREIGN PATENT DOCUMENTS

WO 0146766 6/2001

OTHER PUBLICATIONS

Jackson et al., "Airborne Technology for Distributed Air Traffic Management", "European Journal of Control", Dec. 2005, pp. 1-14, vol. 11, Publisher: EUCA.

(Continued)

*Primary Examiner* — Drew Brown
(74) *Attorney, Agent, or Firm* — Fogg & Powers LLC

(57) ABSTRACT

Methods and systems of controlling an autonomous vehicle are provided. A method comprises controlling operations of the vehicle based at least in part on edge costs. An edge is a representation of a path the vehicle can traverse. Edge costs are determined by an estimation system and are based on at least one of an estimated travel time for an edge and a traverse-ability of the edge. The method further comprises sensing conditions of edges the vehicle is traversing and based on the sensed conditions, dynamically updating the edge costs.

20 Claims, 5 Drawing Sheets

U.S. PATENT DOCUMENTS

| | | | |
|---|---|---|---|
| 7,110,881 B2 | 9/2006 | Gray et al. | |
| 7,206,677 B2 | 4/2007 | Hulden | |
| 7,211,980 B1 | 5/2007 | Bruemmer et al. | |
| 7,272,492 B2 | 9/2007 | McCubbin et al. | |
| 7,603,212 B2 * | 10/2009 | Ariyur et al. | 701/23 |
| 7,627,394 B2 * | 12/2009 | Volcic et al. | 700/245 |
| 7,783,396 B2 * | 8/2010 | Arita et al. | 701/22 |
| 8,000,838 B2 * | 8/2011 | Bhatt et al. | 700/251 |
| 2001/0027360 A1 | 10/2001 | Nakano et al. | |
| 2005/0021192 A1 | 1/2005 | Takafuji et al. | |
| 2005/0216182 A1 | 9/2005 | Hussain et al. | |
| 2006/0074557 A1 | 4/2006 | Mulligan et al. | |
| 2006/0293792 A1 | 12/2006 | Hasegawa et al. | |
| 2006/0293856 A1 | 12/2006 | Foessel et al. | |
| 2007/0046677 A1 | 3/2007 | Hong et al. | |
| 2007/0150173 A1 * | 6/2007 | Neef et al. | 701/200 |
| 2007/0193798 A1 | 8/2007 | Allard et al. | |
| 2007/0241886 A1 | 10/2007 | Breeding | |
| 2008/0009965 A1 | 1/2008 | Bruemmer et al. | |
| 2008/0027591 A1 | 1/2008 | Lenser et al. | |
| 2008/0059015 A1 | 3/2008 | Whittaker et al. | |
| 2008/0125972 A1 | 5/2008 | Neff | |

OTHER PUBLICATIONS

Connolly, C.I. et al., "Path Planning Using Laplace's Equation", "Computer and Information Science Department", Feb. 7, 1994, Publisher: University of Massachusetts At Amherst, Published in: Massachusetts USA.

Connolly, Christopher et al., "On the Applications of Harmonic Functions to Robotics", "Journal of Robotics Systems", Oct. 9, 1993, pp. 931-946, vol. 10, No. 7, Publisher: University of Massachusetts At Amhurst, Published in: Massachusetts USA.

Dijkstra, E.W., "A Note on Two Problems in Connexion with Graphs", "Numerische Mathematik", 1959, pp. 269-271, vol. 1.

Philipp et al., "Single-Chip Stereo Imager", "2006 IEEE International Solid-State Circuits Conference", 2006, Publisher: IEEE, Published in: Baltimore MD.

Li, Z.X. And T.D. Bui, "Robot Path Planning Using Fluid Model", "Journal of Intelligent and Robotic Systems", 1998, pp. 29-50, vol. 21, Publisher: Kluwer Academic Publishers, Published in: Montreal Canada.

Philipp, Ralf, "A Single-Chip Stereo Imager", "Computational Sensory Motor Systems Lab", Jun. 2, 2005, Publisher: John Hopkins University, Published in: New York, US.

Ramirez-Angulo et al., "Real Time Solution of Laplace Equation Using Analog VLSI Circuits", "IEEE International Symposium Circuits and Systems", 1994, pp. 95-98, vol. 4, Publisher: IEEE, Published in: Las Cruces, NM USA.

Stan et al., "Analog VLSI for Robot Path Planning", "Journal of VLSI Signal Processing", 1994, pp. 61-73, vol. 8, Publisher: Kluwer Academic Publishers, Published in: Boston MA.

Thrun, Sebastian, "Learning Occupancy Grids With Forward Models", "School of Computer Science http://www.cs.cmu.edu/~thrun", 2001, Publisher: Carnegie Mellon University, Published in: Pittsburgh, USA.

Valavanis, Kimon et al., "Mobile Robot Navigation in 2-D Dynamic Environments Using an Electrostatic Potential Field", "IEEE Transaction on Systems, Man and Cybernetics-Part A: Systema and Humans", 2000, pp. 187-196, vol. 30, No. 2, Publisher: IEEE.

European Patent Office, "European Search Report", Dec. 2, 2009, Published in: EP.

Gancet et al., "PG2P: A Perception-Guided Path Planning Approach for Long Range Autonomous Navigation in Unknown Natural Environments", "Proceedings of the 2003 IEEE/RSJ International Conference on Intelligent Robots and Systems", Oct. 27-31, 2003, Published in: Las Vegas, NV, USA.

Giesbrecht et al., "A Navigation and Decision Making Architecture for Unmanned Ground Vehicles Implementation and Results With the Raptor UGV", "Technical Report DRDC Suffield TR 2007-300", Dec. 2007, Publisher: Defence R&D Canada.

Koenig et al., "Fast Replanning for Navigation in Unknown Terrain", "IEEE Transactions on Robotics", Jun. 2005, pp. 354-363, vol. 21, No. 3, Published in: Piscataway, NJ, USA.

* cited by examiner

SYSTEM FOR INTEGRATING DYNAMICALLY OBSERVED AND STATIC INFORMATION FOR ROUTE PLANNING IN A GRAPH BASED PLANNER

GOVERNMENT LICENSE RIGHTS

The U.S. Government may have certain rights in the present invention as provided for by the terms of contract number HR0011-06-9-0011 with DARPA.

CROSS-REFERENCE TO RELATED APPLICATIONS

This application is related to U.S. patent application Ser. No. 12/133,321 having a title of "METHOD AND SYSTEM FOR AUTOMATIC PATH PLANNING AND OBSTACLE/COLLISION AVOIDANCE OF AUTONOMOUS VEHICLES" filed on Jun. 4, 2008 (also referred to here as the "'321 Application") and U.S. patent application Ser. No. 12/133,328 having a title of "AUTOMATIC PLANNING AND REGULATION OF THE SPEED OF AUTONOMOUS VEHICLES" filed on Jun. 4, 2008 (also referred to here as the "'328 Application"). The '321 Application and the '328 Application are hereby incorporated herein by reference.

BACKGROUND

Traditional route planning schemes that work well for guiding an autonomous vehicle through congested areas with other moving vehicles, stationary obstacles, etc. can be expected to perform well over only relatively short distances, since they typically must concern themselves with maintaining an internal representation of the area being traversed at a fine level of detail, and must update that representation at a high rate in order to accurately model and respond to the environment. One such planner is described in the '321 reference. Traditional route planners that work well for planning routes over any distance are typically ill-equipped to handle vehicle guidance tasks in a dynamically changing, congested environment. It is desired to have a system that can perform at both fine and coarse levels of detail, and account for the dynamic changes to the environment that may affect the route that the vehicle may take. It is further desired to have a system that retains information obtained about the actual traversal of a path, so that improved estimates can be used to plan future routes that may coincide with all or a portion of any path already traversed. Moreover, it is desired to be able to perform analysis of coarse-level route connections to make automated inferences about potential paths.

SUMMARY OF INVENTION

The above-mentioned limitations of current systems are addressed by embodiments of the present invention and will be understood by reading and studying the following specification. The following summary is made by way of example and not by way of limitation. It is merely provided to aid the reader in understanding some of the aspects of the invention.

In one embodiment, a method of controlling an autonomous vehicle is provided. The method comprises controlling operations of the vehicle based at least in part on edge costs. An edge is a representation of a path the vehicle can traverse. Edge costs are determined by an estimation system and are based on at least one of an estimated travel time for an edge and a traverse-ability of the edge. The method further comprises sensing conditions of edges the vehicle is traversing and based on the sensed conditions, dynamically updating the edge costs.

BRIEF DESCRIPTION OF THE DRAWINGS

The present invention can be more easily understood and further advantages and uses thereof are more readily apparent, when considered in view of the detailed description and the following figures in which.

In accordance with common practice, the various described features are not drawn to scale but are drawn to emphasize specific features relevant to the present invention. Reference characters denote like elements throughout figures and text.

DETAILED DESCRIPTION

Figure 1:
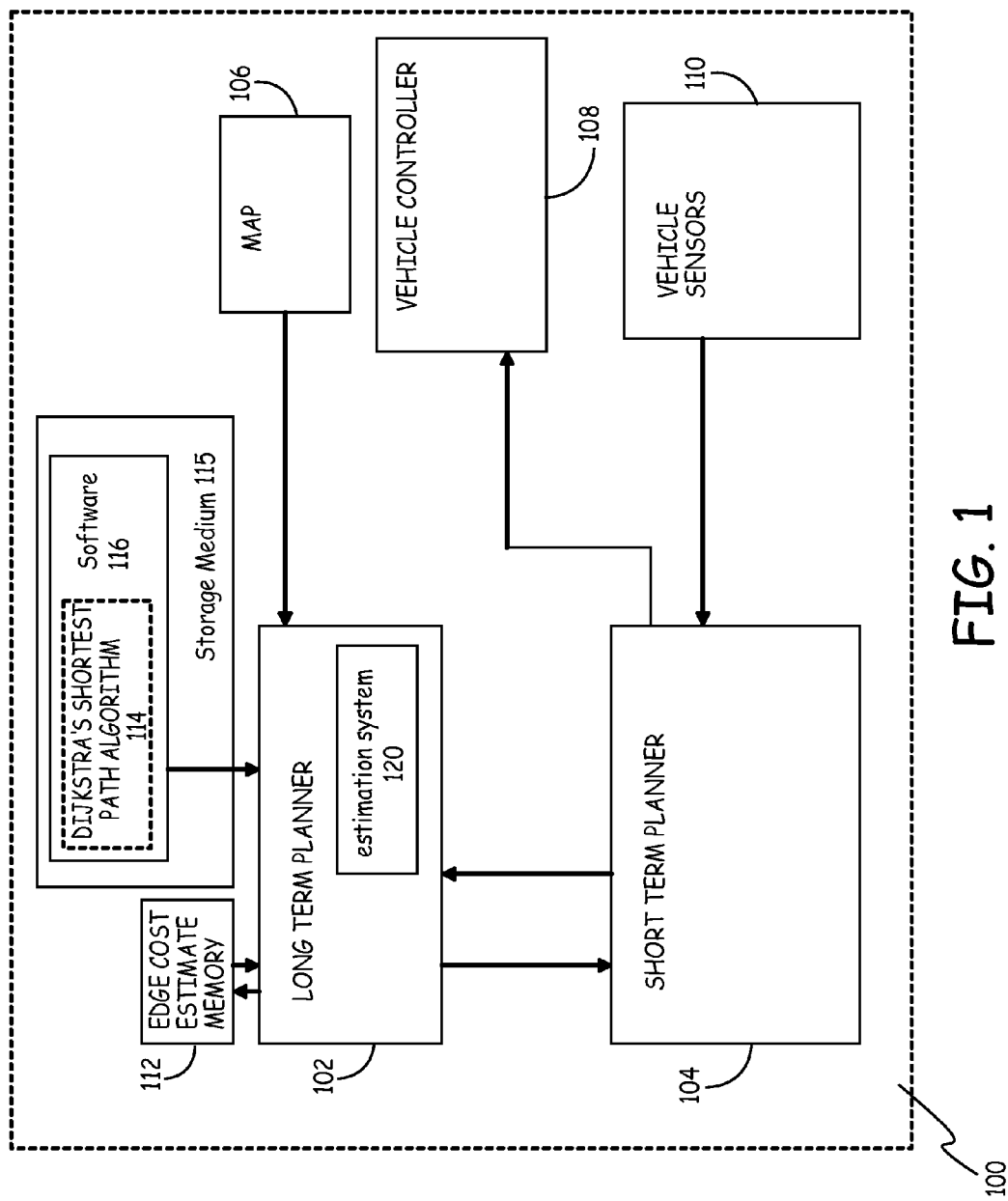
FIG. 1 is a block diagram of one embodiment of the present invention of a sensing, planning, and control system for an autonomous vehicle.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

For the reasons stated above and for other reasons stated below which will become apparent to those skilled in the art upon reading and understanding the present specification, there is a need in the art for an efficient dynamic planning system operating at a coarse level of detail and cooperating with another planner to handle short distances. Embodiments of the present invention heretofore referred to as the "long term planner" provide methods and systems of determining the best coarse-level route between two given points. In embodiments, a long term planner is integrated with a short term planner. In embodiments of the present invention, the short term planner provides methods and systems of determining the best fine-level route between two given points, for example, the short term planner handles short distances.

As defined herein, an edge is a computer representation based on graph theory of the ability to travel from a first point to a second point. The edge is directed so that the edge from the second point to the first point differs from the edge from the first point to the second point. In embodiments, standard graph theory principles and Dijkstra's shortest path algorithm are used. A directed path is constructed with vertices corresponding to known points (also referred to herein as "waypoints") and edges to directional travel from one point to another. The sequence of edges that are linked to each other at waypoints forms the path to traverse to reach a destination or final point from an origin or starting point. In many cases, more than one path links an origin to a destination.

An edge cost is an abstract quantification of the quality of the edge. The higher the edge cost the less desirable it is to take the edge. Edge costs are estimated based on a combination of contributing factors, such as the distance between points (estimated distance), redundancy of the path (e.g. existence of multiple paths, existence of multiple lanes in a multi-lane road), shape of the edge (i.e., whether the edge constitutes a sharp turn), the estimated or observed probability of blockage (traverse-ability), known artificial or real limitations such as speed limits of a road, the performance capabilities of the vehicle, existence of traffic lights, and a number of intersections.

Referring to FIG. 1, an example of an autonomous vehicle 100 of one embodiment is illustrated. As illustrated, the autonomous vehicle 100 includes a long term planner 102, a short term planner 104, edge cost estimate memory 112, and a storage medium 115 storing software 116. In embodiments, the software 116 includes Dijkstra's shortest path algorithm 114. The autonomous vehicle 100 also includes a map 106, a vehicle controller 108, and vehicle sensors 110. An estimation system 120 is housed in the long term planner 102.

The long term planner 102 communicates with the short term planner 104. Information derived from the map 106 is used by the long term planner 102 to plan routes for the autonomous vehicle 100. The vehicle controller 108 controls the autonomous vehicle 100. As illustrated, the short term planner 104 provides vehicle control direction signals to the vehicle controller 108 using real-time processed sensor data from the vehicle sensors 110. Vehicle sensors 110 provide sensor data information to the short term planner 104. In embodiments, the long term planner 102 provides route information to (and receives feedback information from) the short term planner 104.

The short term planner 104 uses real-time processed sensor data from the vehicle sensors 110 to plan a path to the next waypoint set out by the long term planner 102 and in the process of doing so, builds a detailed record of the properties of that edge. In embodiments, this record is integrated with existing information in the long term planner 102 to improve its edge cost estimates stored in the edge cost estimate memory 112. The estimation system 120 is a system to rank possible paths to a destination or waypoint based on at least an estimated travel time as a cost function. In embodiments, the short term planner 104 provides the sensor data to the long term planner 102 that redefines the cost estimates of "risky" or blocked roads that may impede the vehicle 100. The edge cost estimates are stored in the edge cost estimate memory 112 and updated by the long-term planner 102 accordingly.

The software 116 and/or firmware executed by the long term planner 102 comprises a plurality of program instructions that are stored or otherwise embodied on the storage medium 115. At least a portion of such program instructions are read for execution by processors in the long term planner 102. In one implementation, the long term planner 102 includes processor support chips and/or system support chips such as application-specific integrated circuits (ASICs).

In one implementation of this embodiment, the vehicle sensors 110 include, but are not limited to a navigation system aided by GPS, wheel odometry, cameras, Doppler radar, ring laser gyroscopes, accelerometers, a stereoscopic vision system, long range radar, short range radar, range detectors, vision aided inertial navigation systems for vehicle position, attitude, acceleration, and rotation rates, and combinations thereof. In another implementation of this embodiment, the sensor data is received from one or more external vehicles that implement one or more of the above mentioned sensors. In yet another implementation of this embodiment, the sensor data is received from one or more external vehicles that implement sensors and send sensor data that includes information indicative of human observations of the vehicle 100 and/or information indicative of human observation of information indicative of the vehicle 100. In yet another implementation of this embodiment, the sensor data includes input from satellites. Other types of sensors are possible, including sensors that have not yet been developed.

Figure 2:
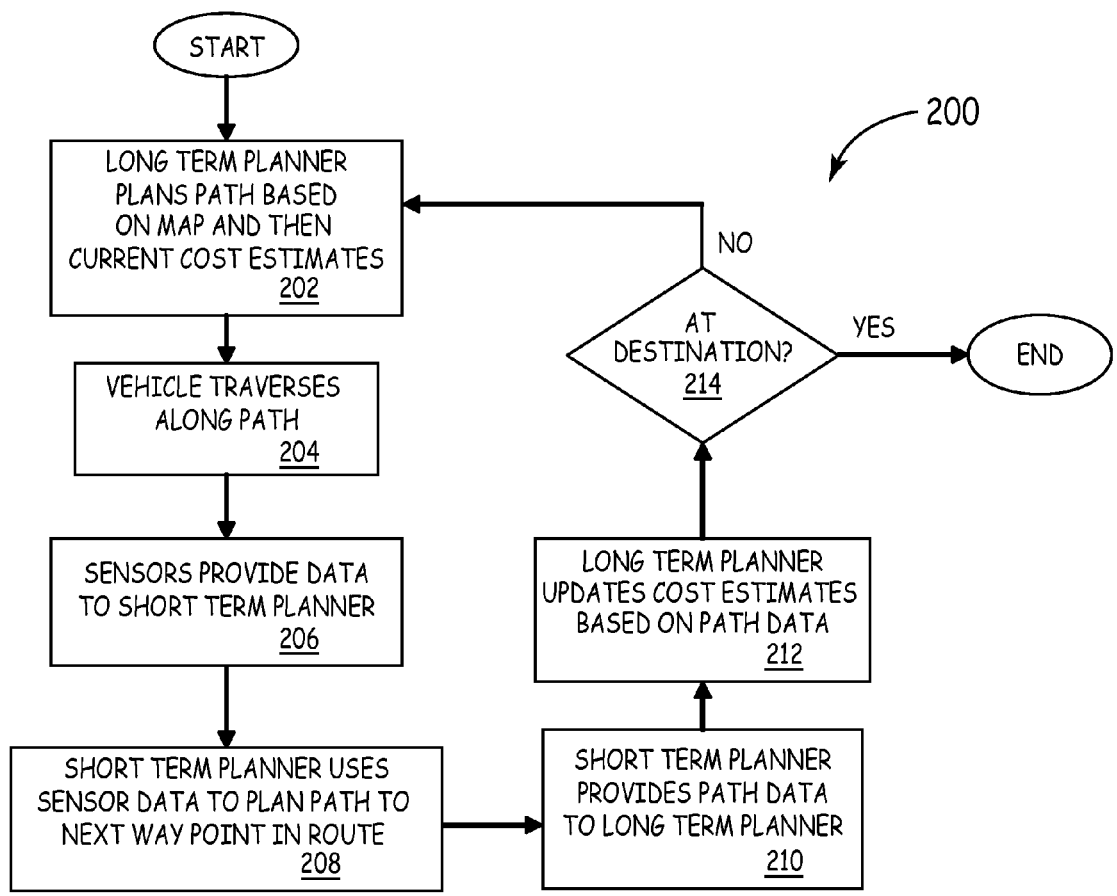
FIG. 2 is a traversal flow diagram of one embodiment of the present invention.

Referring to FIG. 2, a traversal flow diagram 200 of one embodiment is illustrated. In this embodiment, the process starts with the long term planner 102 creating a route (also referred to herein as a path) based on input from the estimation system 120, the map information 106, and the then current cost estimates in the edge cost estimate memory 112 for each edge defined by waypoints that make up the route to the destination (202). The long term planner 102 implements a graph describing an area to be traversed by the vehicle 100. The graph includes waypoints, which are connected with traversable edges. The long term planner 102 associates edge costs for each edge based at least in part on at least one of a distance of the edge, an estimated time to traverse the edge, and the traverse-ability of the edge. Based on the edge costs of the edges, the long term planner 102 plans a route to the destination through select edges.

In one implementation of this embodiment, the long term planner 102 applies Dijkstra's algorithm to the edge costs in selecting a path of edges to traverse to the destination. In another implementation of this embodiment, the long term planner is configured to avoid roadblocks by assigning edge costs that give preference to at least one of longer routes with multiple alternative paths and slower routes with multiple alternative paths over those routes that are shorter with fewer alternative paths and/or routes that are faster but with fewer alternative paths. In yet another implementation of this embodiment, the long term planner 102 adjusts edge costs to potentially favor routes having redundancy, so that the distance that the vehicle 100 has to travel if an edge is blocked is reduced by using one of the redundant routes. In yet another implementation of this embodiment, the long term planner 102 implements the graph describing an area to be traversed by the vehicle 100 to determine intersections in the area.

The vehicle 100 then travels along the path through the selected edges (204), which in combination form the selected route to the destination. This selected route is defined herein as the original route. Based on feedback from the short term planner 104 to the long term planner 104, the original route may be changed while the vehicle is en route. While traversing through the select edges, the edge costs are updated based on sensed information relating to conditions of the edges. Specifically, as the vehicle 100 is traveling along the path, vehicle sensors 110 provide data to the short term planner 104 (206). The short term planner 104 uses the sensor data to further plan the actual path represented by an edge to the next waypoint (208). In addition, select sensed condition signals based on the sensor data are determined (selected) by the short term planner 104 and are provided to the long term planner 102 (210) in order to inform the long term planner 104 of the interpreted and sensed conditions. In some embodiments, the short term planner 104 informs the long term planner (102) through the sensed condition signals of aggregate or interpreted information of a road block. For example, this information may indicate that the road is blocked so that the vehicle 100 cannot traverse the path. For another example, the information may indicate the total distance travelled since the last waypoint, or even a representation of the actual path driven.

The information in the sensed condition signals are used by the long term planner to determine how expensive it is to travel from one point to the next. The long term planner 102 then updates cost estimates based on the sensed condition signals (212). In one implementation of this embodiment, the edge costs are updated when the vehicle reaches the next expected waypoint in the route. In this case, each edge starts and ends on a waypoint. It is then determined if the vehicle 100 is at the destination at (214). If the vehicle 100 is at the destination (214), the process ends. If the vehicle 100 is not at the destination, the process continues at (202), where the long term planner 102 plans a route based on the map 106 and the latest edge cost estimates stored in the edge cost estimate memory 112. Hence, in some embodiments, the short term planner 104 provides data relating to the traverse-ability of an edge to the long term planner 102. The long term planner 102 uses the data to update edge cost estimates and then, if needed, alters the original route to the destination. The data may include anything related to the path, such as, if a path is blocked. Moreover in one embodiment, the data may include information relating to the distance and the time taken to traverse an edge arrived at upon completion of the traversal of the edge. In one embodiment, the long term planner 104 uses this data for future reference in planning routes through the area. For example, if the actual length between two waypoints that define an edge is different than originally estimated, the estimate will be updated and the cost estimates are then used to re-compute future optimal paths using Dijkstra's shortest path algorithm 114.

Figure 3:
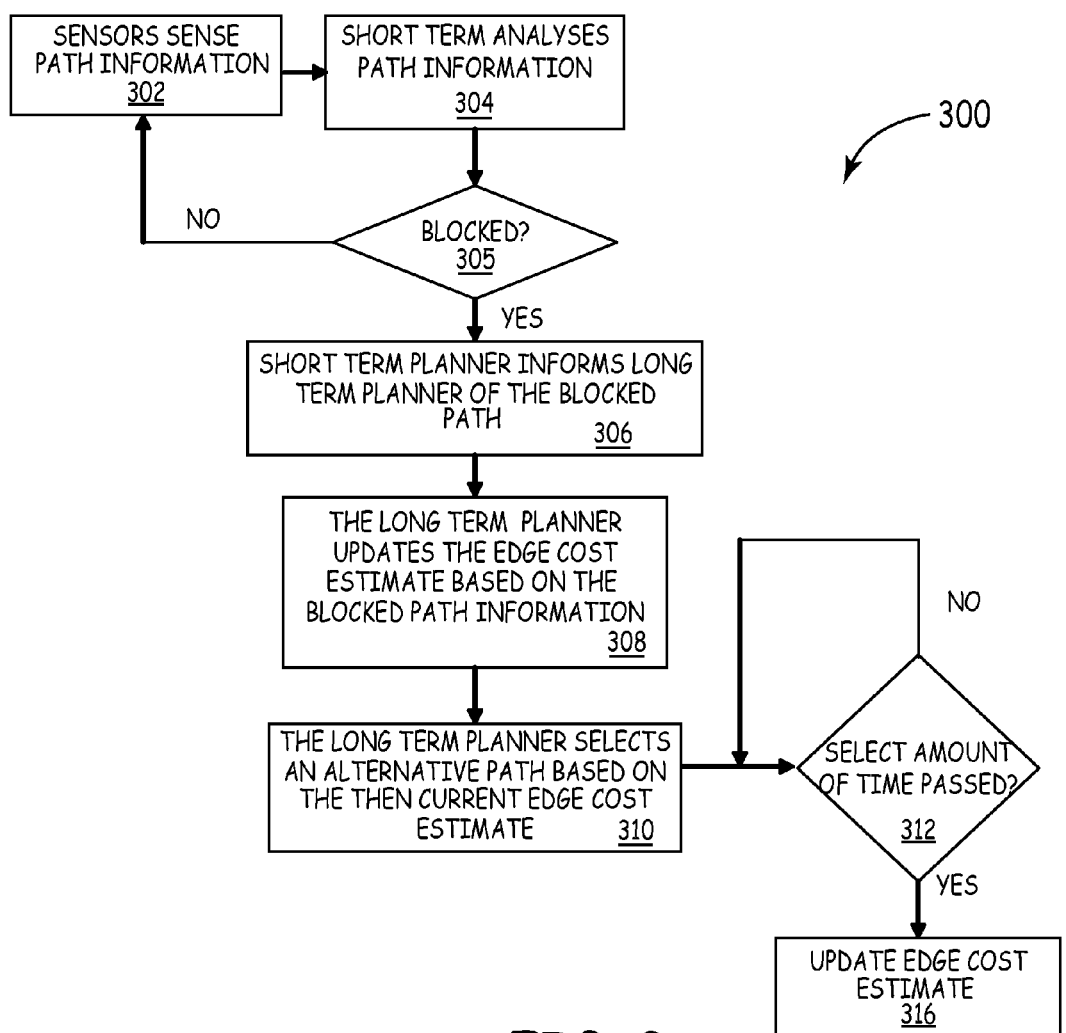
FIG. 3 is a blocked path flow diagram of one embodiment of the present invention.

In one embodiment, if the short-term planner 104 determines that a path is blocked, the long-term planner 102 chooses an alternate path based on the most recent edge cost estimate in the edge cost estimate memory 112. An example of such an embodiment is illustrated in the blocked path flow diagram 300 of FIG. 3. As the flow diagram 300 indicates the vehicle sensors 110 of the vehicle 100 sense path information at (302). The short term planner 104 analyses the sensor data (304) and then determines if the desired path is blocked (305). If the path is not blocked (305), the process continues at 302. If the path is blocked 305, the short term planner 104 informs the long term planner 102 of the situation via sensed condition signals (306). The long term planner 102 then updates the edge cost estimate based on the blocked path information (308). The long term planner 102 then selects an alternate path based on the then current edge cost estimates (310) and provides that plan to the short term planner 104. In one embodiment, while the short term planner 104 executes to the new plan, the long term planner 102 periodically updates the probability that an edge is blocked, thus allowing for the possibilities that a blocked path may no longer be blocked or that a free path may become blocked. The "aging" of the probability of blockage allows for a more flexible path determination by ensuring that out-of-date information is eliminated from consideration in the planning of future paths. In this embodiment, the long term planner 102 determines if a select amount of time has passed (312). If the select amount has not passed (312), the long term planner 102 continues monitoring the time. Once the select amount of time has passed (312), the edge cost estimate is updated to reflect that the path may not be blocked anymore (316). In this manner, the long term planner 102 adjusts edge costs with the passage of time and in the absence of new sensed data for the edge. Hence, in a future traversal of the area the cost estimate will not reflect as much certainty that the path is blocked, since the blockage could have been removed after the last traversal through the area.

As discussed above, embodiments employ Dijkstra's shortest path algorithm in determining a path to take. This is a well-known algorithm that was first described by E. W. Dijkstra in *A note on two problems in connexion with graphs* published in *Numerische Mathematik*, 1 (1959), pg. 269-271.

A graph illustrating the shortest path can be represented by G(V, E, C) with V being the vertices representing waypoints defined in a map, E being the edges representing a traversable path from one waypoint to another, and C being the cost matrix containing one value per ordered pair of waypoints specifying the cost of the edge from the first waypoint to the second. D(G) will be the result of executing Dijkstra's algorithm on graph G. The result of Dijkstra's provides the cost of the shortest path between any two waypoints, as well as the linked edges to traverse in order to reach a destination from an origin.

Figure 4:
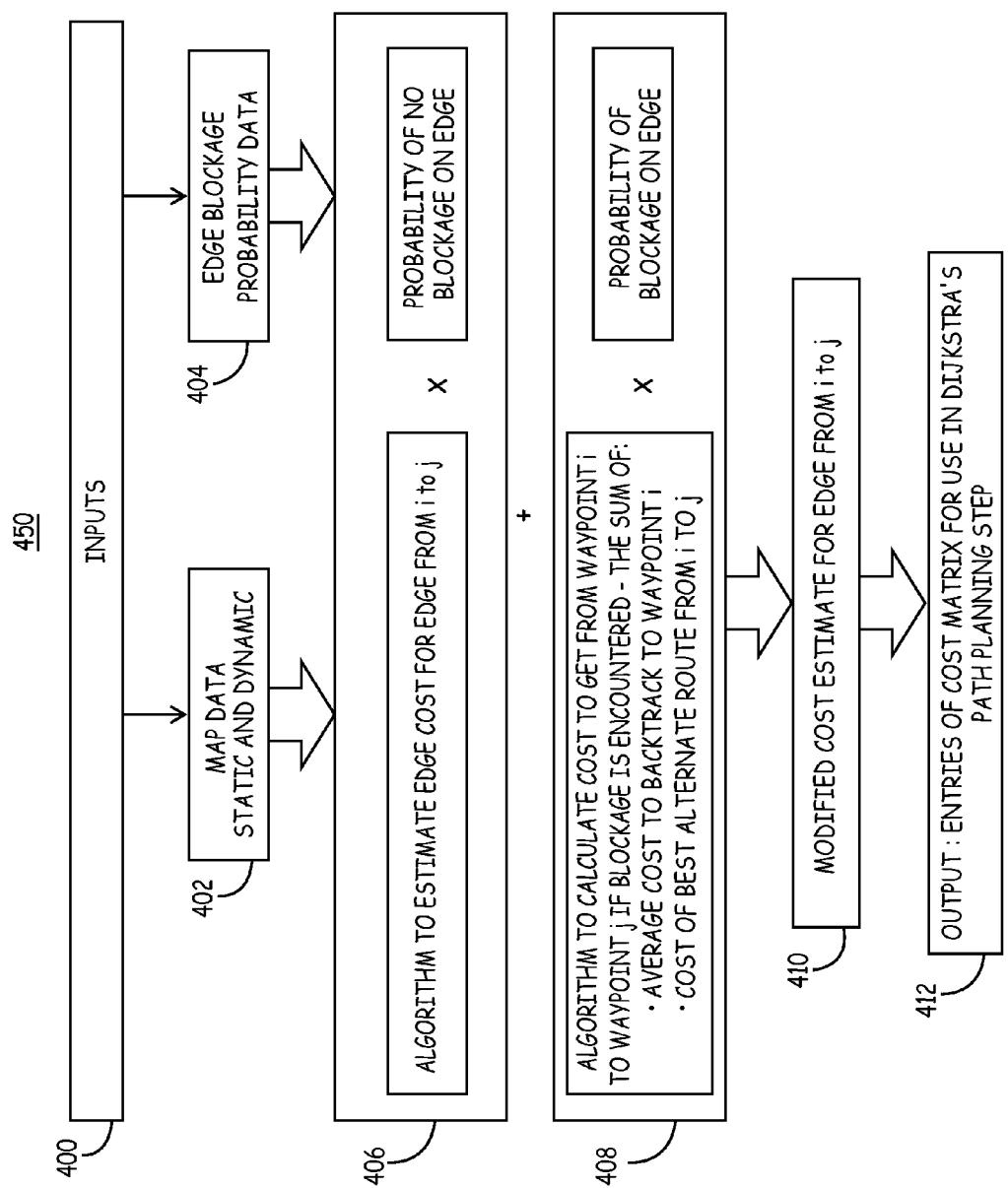
FIG. 4 illustrates the method of implementing algorithms to calculate edge cost estimates in one embodiment of the present invention.

In embodiments, a modified version of the edge cost estimates to be used in Dijkstra's algorithm is used when there is a possibility of a blocked road. FIG. 4 illustrates the method 450 of implementing algorithms to calculate edge cost estimates in one embodiment of the present invention. As shown in this flow diagram representative of a modified cost estimation algorithm for an edge from a waypoint i to a second waypoint j, at any given time, the system has two collections of data that provide the key inputs to the cost estimation.

The first collection of data is the map data (402) obtained from static map information sources (inputs 400) and dynamically-observed path information from edges already travelled (inputs 400) from waypoint i to second waypoint j. The short term planner 104 collects data from static map information sources and collects data from dynamically-observed path information from edges already travelled. The map data is used to build the graph G(V, E, C) mentioned above, and ultimately to calculate the modified cost matrix C' (412). G(V, E, C) contains the data necessary to estimate the edge cost from waypoint i to waypoint j, the average cost to backtrack to i if the edge is found to be blocked, and the cost of the best alternate route from waypoint i to waypoint j. The alternate route from waypoint i to waypoint j is then determined by executing Dijkstra's algorithm on G(V, E−ij, C−$i_j$). In the graph G(V, E−ij, C−ij), the original blocked edge from waypoint i to waypoint j is removed from the original set of edges (i.e., E−ij) and the corresponding entry is also removed from the cost matrix (i.e., C−ij).

The second collection of data is the probability of blockage data (404) that is maintained for each edge in the graph representation of the map. The short term planner 104 collects edge block probability data obtained from dynamically-observed path information from edges already travelled (inputs 400). Each edge block probability provides a numeric value from 0% to 100%, inclusive, indicating how likely the edge is to be blocked and, by definition, the probability that the edge is not blocked. For example, a probability of 100% indicates that the edge was recently driven and, at that time, it was detected to be blocked. A probability of 0% indicates that the edge was very recently driven and, at that time, was detected to be unblocked (i.e., it was determined that the road was passable at that time). In the complete absence of observed information for an edge, the probability of failure is set to a nominal value. For example, in one embodiment of the invention, map data is expected to be highly accurate, so the nominal probability of blockage is set to 5% for a single lane road and 2.5% for a two-lane road. In embodiments, the probabilities are adjusted over time so that they move from extreme values to return to the nominal value. This allows the system to allow for a road that was blocked to become unblocked, and vice versa.

In FIG. 4, the algorithms are shown in block form with mathematical symbols of a plus sign (+) and times signs (x) to indicate the mathematical relational function of the algorithms used to modify the cost estimate for an edge and the edge block probability data. The modified cost estimate (410) results from the summation of the cost of the edge from waypoint i to waypoint j times the probability of no blockage (406) (e.g., X %) and the cost to get from waypoint i to waypoint j via an alternate route times the probability of blockage (408) (e.g., (100–X) %). The modified cost estimation for an edge from waypoint i to waypoint j causes the planner to prefer routes that are close to being the best route and that have a lower cost to re-route if they edge is blocked. These routes are chosen over the routes that are slighter faster but, which would have an expensive re-route cost if a blockage were to force a detour on the first selected route.

In one implementation of this embodiment, the modified cost estimation algorithm of FIG. 4 is implemented after a path represented by an edge is blocked. In this case, the graph G(V, E–ij, C–ij) ensures that the original blocked edge in the original route is not returned as an edge in the modified route. The calculated cost to get from waypoint i to waypoint j if blockage is encountered is based on two parameters: the average cost to backtrack, and the cost of the best alternative route from waypoint i to waypoint j.

In another implementation of this embodiment, the modified cost estimation algorithm of FIG. 4 is always implemented to favor routes with numerous short segments that have low-cost alternate paths over routes with long segments and high-cost alternate paths. The modified cost estimation algorithm of FIG. 4, allows the vehicle to take a long segment route if the benefit of that route is so high that taking that route is worth the risk of blockage. In this manner, edge costs are adjusted to favor routes having redundancy, so that the distance that the vehicle has to travel if an edge is blocked is reduced by using one of the redundant routes.

After this modified cost estimation algorithm is performed for every edge and the resultant costs are retained in C' (412) the long term planner 102 performs one final execution of Dijkstra's using a graph G(V, E, C') (or alternatively, G(V, E–ij, C–ij)) which will output the shortest path between any two waypoints using the modified cost estimation. Since the path from one destination waypoint to the next will never go through an edge twice, C' is updated every time the long term planner 102 updates the map data or probability of blockage. The long term path planner 102 is rerun due to either a blocked road or when the vehicle 100 is close to reaching the next destination waypoint in its list (assuming this is not its final destination).

In embodiments, the cost estimates are improved every time an edge is traversed. Once an edge has been successfully navigated, the information gathered during that process is used to improve the estimate for the rest of the path and the future path traversals. For example, when a path is navigated for the first time, it is possible that the optimal route was not taken by the short term planner. Thus, the actual driving time and path length should not be used to create the improved estimate, since it would cause the estimate to be overly pessimistic.

Figure 5:
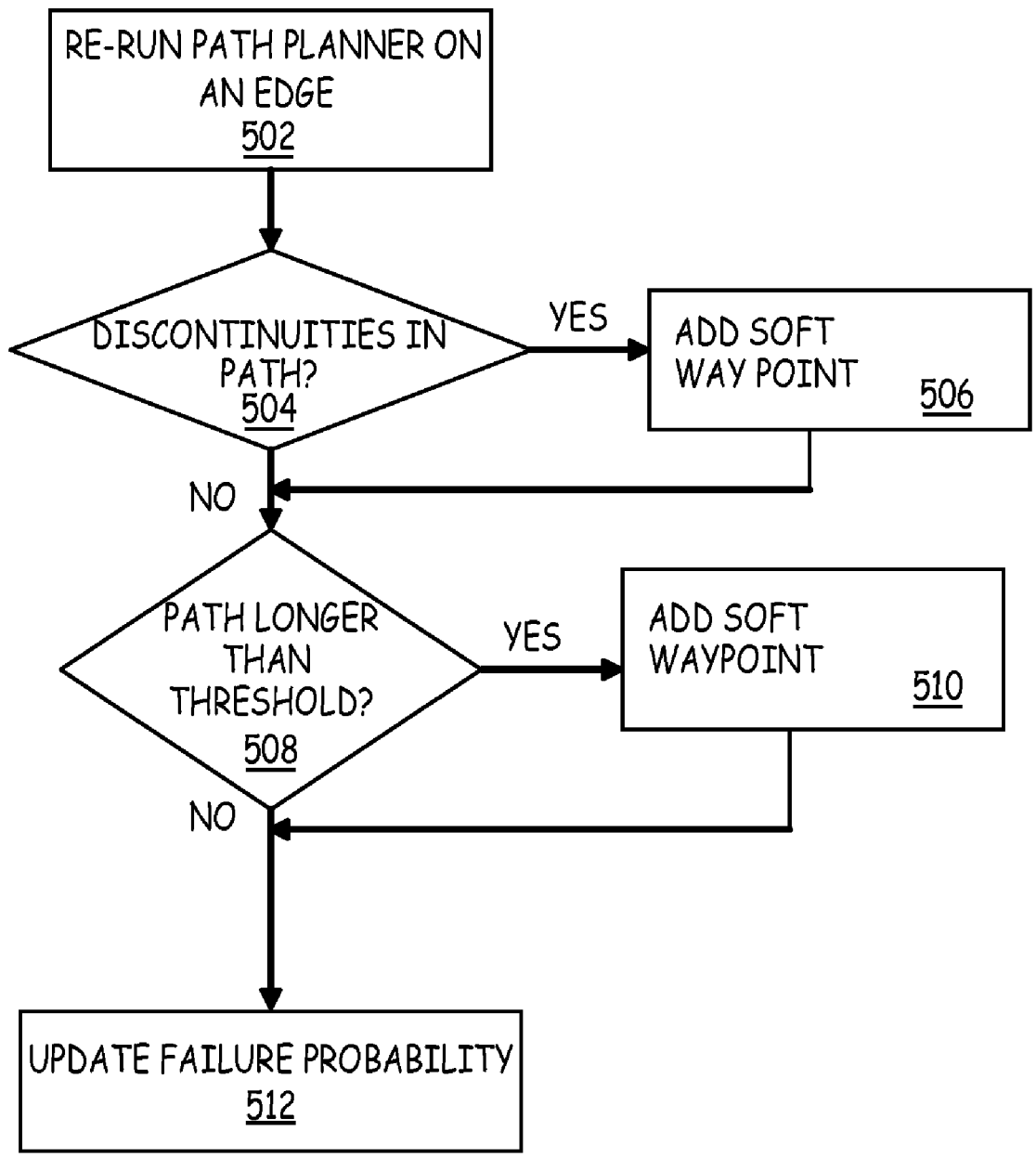
FIG. 5 is an improved cost estimate flow diagram of one embodiment of the present invention.

Referring to FIG. 5, an improved cost estimate flow diagram 500 is illustrated. As illustrated, a path planner, such as the short term planner 104 of FIG. 1, is re-run in a simulation mode on an edge to find an optimal path around all the obstacles detected en-route (502). It is determined if detected obstacles introduced any significant discontinuities in the path at (504). If there are significant discontinuities in the path, an additional "soft" waypoint is generated and added at the discontinuity (506). For example, a path is considered to have a discontinuity if the map 106 shows the road as straight but, in actuality, the road jogs, i.e., has a brief abrupt change in direction for a distance greater than a selected discontinuity threshold. A soft waypoint is a temporary additional waypoint. In one implementation of this embodiment, the soft waypoint may be a property associated with the edge. In another implementation of this embodiment, the soft waypoint becomes an end for two connected "soft" edges that extend from it. In this case, the two "soft" edges end at the original waypoints for the original edge. Since the location of the soft waypoints may be inaccurate with respect to the actual path, they cannot be trusted as highly as waypoints from the initial map data. Therefore, these soft waypoints are marked in such a way that they can be distinguished from the original waypoints.

It is then determined if the path is longer (either in time or length) than a select threshold (508). If the path is longer than the threshold (508), an additional soft waypoint somewhere in the path is added (510). The threshold is most likely determined by the area considered by the short term path planner. The next waypoint should always be within the area considered by the short term path planner. This modified path will be valid for future traversals of the area, though the soft waypoints will not be held to as high a requirement as the normal waypoints from the map data for purposes of driving directly over them. Finally, no matter what the new value of the edge cost estimate is determined to be, the failure probability of the edge is updated to zero (514). In one implementation of this embodiment, after the soft waypoint is successfully used in an edge more than a selected number of times, then the soft waypoint is considered to be a normal waypoint and is then held to as high a requirement as the normal waypoints from the map data for purposes of driving directly over them.

In embodiments the steps set out in the improved cost estimate flow diagram 500 are done in the background and do not affect the actual path being currently driven. In one embodiment, the short term path planner is run for this purpose only once (rather than, for example, at a rate of 10 Hz) for each segment after its traversal is completed. A separate instance of the short term path planning algorithm is run while the long term path planner 102 is not doing other useful work. Making these changes modifies the cost matrix and potentially the graph, and therefore C and C' need to be recalculated before the long term path planner is re-run.

In one embodiment, initial cost estimates for each edge are defined based on the map 106. Additional waypoints are added if there are large gaps between waypoints. In one embodiment, an initial path length estimate for the waypoints on each segment is determined by considering the edge between two waypoints as a straight line. In another embodiment, an initial path length estimate for the waypoints on each segment is determined by fitting a higher-degree polynomial through all the waypoints in a segment and then calculating its length. Once the path length is known, embodiments assume that the vehicle will be driving at the speed limit. This gives an estimated travel time, which is used as the cost function to run Dijkstra's algorithm to determine the base cost matrix that is not modified for failure probability. Because the vehicle has not traveled these roads yet, the actual time taken may be longer. For this reason, one embodiment penalizes the initial estimate by another factor. An example factor is 10%. The optimal factor can be determined by experimentation. Initially all paths will have the same penalty. After a road has been traveled, there will be enough information gathered so that penalties need not be applied to edges in the traveled path. In embodiments, if two adjacent waypoints are far apart (more than the area considered by the short term path planner), additional soft waypoints are supplied to simplify the search later. If the waypoints are part of a larger segment, in one embodiment a polynomial fitting is used to come up with a suggested path estimate and to define waypoints. In a further embodiment the short term path planner will "project" the waypoint to the edge of the area it considers. In addition, in another embodiment, when a Terraserver image, Google Earth image or the like is available in which a road corresponding to an edge can be identified, the edge can be manually analyzed and soft waypoints can be defined to better approximate the road. In yet another embodiment, this information may be communicated directly from another vehicle that has traversed a path or indirectly from said vehicle via a shared data repository; in turn, this vehicle may communicate path information to another vehicle or save it to a remote data repository.

In embodiments, the path plan of the long term planner 102 is recalculated based on circumstances. One circumstance is when a road (edge) is blocked. Another circumstance is when the vehicle is near a destination waypoint at the end of a mission segment. A destination waypoint is an ordinary waypoint that happens to be the final waypoint of the current mission. It is desirable for the vehicle to start the next mission segment immediately upon completion of the previous one, so up-to-date information is important. Yet another circumstance is when the costs are re-estimated for an edge that was traversed during an earlier mission segment. This may happen either because there was not enough computation power available, or because it was near the end of the previous mission segment. In that case, the current path is recalculated in case a new optimal path will either include (in the case where it was excluded) or exclude (in the case where it was included) the path that was just re-estimated. A circumstance also includes when the failure probability for any path is updated. Changes in any of these circumstances will potentially change the path of the current mission segment. The change in circumstances will not change the path if it is an improvement in the failure probability of an edge already in the best path being driven, or if it is a worsening of the failure probability of an edge not in the path being driven. Moreover in one embodiment, changes in the path plan do not alter the current targeted waypoint, since in a degenerate case the plan could alternate the targeted waypoint between two waypoints for infinity without ever reaching either of them. Because of this, the long term planner 102 only plans paths beginning at the next expected waypoint the vehicle will reach, and not from the vehicle's current position.

As discussed above, failure probabilities of routes are aged out in some embodiments. For example, in one embodiment, nominal values of 5% for a one lane road, 3% for 2 lane road (because it is harder to block two lanes with a disabled vehicle) are set. For routes that have been traveled successfully, the probabilities of failure are re-set to 0%, and linearly aged to the nominal value over a 30-minute window. For routes that have failed because they are blocked by disabled vehicle(s), the probability of blockage is set to 100% and linearly aged to the nominal value over a 30-minute window. For routes that have failed because they are blocked by k-rails or other permanent obstacle(s), the probability of blockage is set to 100% and linearly aged over a 2-hour window. The probabilities in embodiments are updated at some well-defined rate, for example every 1-2 minutes. In one embodiment, this is the same rate at which the planner is re-run.

Additionally, if there are multiple paths between two points, edge costs are adjusted to favor routes that have more redundancy. This reduces the distance that the vehicle will have to backtrack if a path is blocked. The edge costs of the path are determined by a combination of physical characteristics and environmental factors, including but not limited to: estimated linear distance, existence of multiple paths, multiple lanes, probability of blockage, existence of traffic lights, number of intersections, etc. The assigned costs are combined using a linear combination and are subsequently used as the edge costs for Dijkstra's shortest path algorithm.

In one implementation of this embodiment, the vehicle is a vehicle capable of underwater travel. In another implementation of this embodiment, the vehicle is an aircraft.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of controlling an autonomous vehicle using a graph representing a plurality of routes the vehicle can travel, the graph comprising a plurality of vertices and a plurality of edges, wherein the vertices represent waypoints and each edge connects a respective two of the vertices, the method comprising:
   controlling operations of the vehicle based at least in part on edge costs, wherein the edge costs are determined by an estimation system and are based on at least one of an estimated travel time for one of the plurality of edges and a traverse-ability of the edge;
   sensing conditions of edges the vehicle is traversing; and
   based on the sensed conditions, dynamically updating the edge costs for a current traversal from a starting point to a destination.

2. The method of claim 1, wherein controlling operations of the vehicle based at least in part on the edge costs, further comprises:
   implementing a graph-based long term path planner, wherein the long term planner uses the edge costs to select from the plurality of edges a sequence of edges to traverse to reach the destination;
   interpreting the sensed conditions along a traversed edge with a short term planner of the vehicle; and
   informing the long term planner of the interpreted and sensed conditions with the short term planner.

3. The method of claim 1, further comprising:
   adjusting the edge costs with the passage of time and in the absence of new sensed data for the edge.

4. The method of claim 1, further comprising:
   updating the edge costs upon reaching a next expected waypoint in the current traversal from the starting point to the destination.

5. The method of claim 1, further comprising:
   collecting data from static map information sources; and
   collecting data obtained from dynamically-observed path information from the edges already travelled.

6. The method of claim 1, further comprising:
   adjusting the edge costs to favor routes having redundancy, wherein the distance that the vehicle has to travel if an edge is blocked is reduced by using one of the redundant routes.

7. The method of claim 1, wherein the contributing factors to the edge costs include at least one of an estimated distance, existence of multiple paths, existence of multiple lanes, probability of blockage, existence of traffic lights, and a number of intersections.

8. The method of claim 1, further comprising:
determining if a path has a discontinuity; and
generating at least one soft waypoint at the discontinuity based on the determination of the discontinuity.

9. The method of claim 1, further comprising:
updating the edge costs associated with a traversed edge once the vehicle has traversed the edge.

10. A method of operating an autonomous vehicle using a graph representing a plurality of routes the vehicle can travel, the graph comprising a plurality of vertices and a plurality of edges, wherein the vertices represent waypoints, the method comprising:
implementing the graph describing an area to be traversed by the vehicle;
connecting the waypoints of the graph with traversable edges;
associating edge costs for each edge based at least in part on at least one of a distance of the edge, an estimated time to traverse the edge and traverse-ability of the edge;
based on the edge costs of the edges, planning a path to a destination through select edges at a graph-based long term path planner;
while traversing through the select edges, updating the edge costs at the graph-based long term path planner based on sensed information relating to conditions of the edges received from a short term planner; and
updating the path based on the updated edge costs at the graph-based long term path planner.

11. The method of claim 10, further comprising:
upon completion of the traversal of an edge, updating the an edge cost associated with the edge for future traversal estimates.

12. The method of claim 10, wherein the edge costs are further based at least in part on at least one of redundancy of paths connected to edge, whether the edge constitutes a sharp turn, an estimated probability of failure of traversal through the edge, limitation of road that makes up the edge, limitations of the vehicle, existence of multiple lanes, existence of traffic lights and number of intersections.

13. The method of claim 10, further comprising:
determining intersections.

14. The method of claim 10, further comprising:
applying Dijkstra's algorithm to the edge costs in selecting a path of edges to traverse to the destination.

15. The method of claim 10, further comprising:
adjusting edge costs to favor routes having redundancy, wherein the distance that the vehicle has to travel if an edge is blocked is reduced by using one of the redundancy routes.

16. An autonomous vehicle, the vehicle comprising:
a vehicle controller configured to control operations of the vehicle using a graph representing a plurality of routes the vehicle can travel, the graph comprising a plurality of vertices and a plurality of edges, wherein the vertices represent waypoints and each edge connects a respective two of the vertices;
a long term planner configured to determine a path set out by waypoints to a destination, wherein the long term planner determines the path based on edge costs associated with the edges that connect the waypoints,
sensors configured to sense conditions associated with an edge while traversing the edge; and
a short term path planner configured to provide vehicle control directions to the vehicle controller using real-time processed sensor data from the sensors to a next waypoint in the path set out by the long term planner, the short term planner further configured to provide sensed condition signals based on the sensor data to the long term planner, wherein the long term planner is further configured to update edge costs based on the sensed condition signal.

17. The vehicle of claim 16, wherein the long term planner is configured to apply Dijkstra's shortest path algorithm to the edge costs in determining a path.

18. The vehicle of claim 16, further comprising:
a memory to store the then current edge costs.

19. The vehicle of claim 16, wherein, the long term planner is further adapted to update edge costs once the vehicle has traversed the associated edge based on the sensed condition signals.

20. The vehicle of claim 16, wherein the long term planner is configured to avoid roadblocks in assigning edge costs by giving preference to at least one of longer routes and slower routes with multiple paths over those routes that are shorter and/or slower but with fewer alternative paths.

* * * * *